(12) United States Patent
Harrington et al.

(10) Patent No.: US 11,423,606 B2
(45) Date of Patent: *Aug. 23, 2022

(54) TECHNOLOGIES FOR RENDERING ITEMS WITHIN A USER INTERFACE USING VARIOUS RENDERING EFFECTS

(71) Applicant: CIMPRESS SCHWEIZ GMBH, Winterthur (CH)

(72) Inventors: Ramon Harrington, Hanover, MA (US); Jon Gaudette, Shrewsbury, MA (US); Jarongorn Manny Lertpatthanakul, Windham, NH (US)

(73) Assignee: CIMPRESS SCHWEIZ GMBH, Winterthur (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/170,415

(22) Filed: Feb. 8, 2021

(65) Prior Publication Data

US 2021/0166471 A1 Jun. 3, 2021

Related U.S. Application Data

(63) Continuation of application No. 16/661,336, filed on Oct. 23, 2019, now Pat. No. 10,950,035, which is a
(Continued)

(51) Int. Cl.
*G06F 3/041* (2006.01)
*G06T 15/50* (2011.01)
G06T 11/60 (2006.01)
*G06F 3/0346* (2013.01)
*G06Q 30/06* (2012.01)
*G06F 3/04842* (2022.01)

(52) U.S. Cl.
CPC ............ *G06T 15/50* (2013.01); *G06F 3/0346* (2013.01); *G06T 11/60* (2013.01); *G06F 3/04842* (2013.01); *G06Q 30/0643* (2013.01)

(58) Field of Classification Search
CPC ......... G06K 2009/4666; G06K 9/2081; G06K 9/342; G06K 9/38; G06K 9/46;
(Continued)

(56) References Cited

U.S. PATENT DOCUMENTS

2008/0031499 A1 2/2008 Mills et al.
2012/0256948 A1* 10/2012 Fermin ................. G06T 15/503
345/629
(Continued)

OTHER PUBLICATIONS

Color photograph of standard business cards, image downloaded from the Internet at: <https://www.vistaprint.com/business-cards/standard?GP=07%2f23%2f2018+13%3a18%3a21&GPS=5120582000&GNF=0.
(Continued)

*Primary Examiner* — Insa Sadio
(74) *Attorney, Agent, or Firm* — Marshall, Gerstein & Borun LLP

(57) ABSTRACT

Systems and methods for rendering items with a user interface of an electronic device are described. According to certain aspects, an electronic device may detect its orientation and render, in a user interface, a physical item using a rendering effect determined from the orientation. As a user of the electronic device reorients the electronic device, the electronic device may automatically and dynamically update the rendering with an updated rendering effect to reflect the updated orientation. In embodiments, the user may use the electronic device to complete an order for the physical item.

20 Claims, 7 Drawing Sheets

Related U.S. Application Data continuation of application No. 15/949,931, filed on Apr. 10, 2018, now Pat. No. 10,467,802.

(58) Field of Classification Search
CPC .. G06K 9/4604; G06K 9/4652; G06K 9/6267; G06T 2207/10024; G06T 2207/20072; G06T 2207/20192; G06T 2207/30108; G06T 5/00; G06T 5/002; G06T 7/0004; G06T 7/11; G06T 7/13; G06T 7/162; G06T 7/194; G06T 7/90; G06T 13/80; G06T 15/503; G06T 15/506; H04N 1/00209; H04N 1/3872; H04N 1/409

See application file for complete search history.

(56) References Cited

U.S. PATENT DOCUMENTS

| | | | | |
|---|---|---|---|---|
| 2012/0259727 | A1* | 10/2012 | Fermin | G06T 19/20 705/26.5 |
| 2013/0335437 | A1* | 12/2013 | Lynn | G06T 13/80 345/589 |

OTHER PUBLICATIONS

Samsung SM-R365 User Manual (Sep. 2017).
Zibreg, A closer look at iOS7 parallax effect, iDownloadBlog.com, downloaded from the Internet at: <http://www.idownloadblog.com/2013/06/28/ios-7-parallax-effect-explained/. (published Jun. 28, 2013).

* cited by examiner

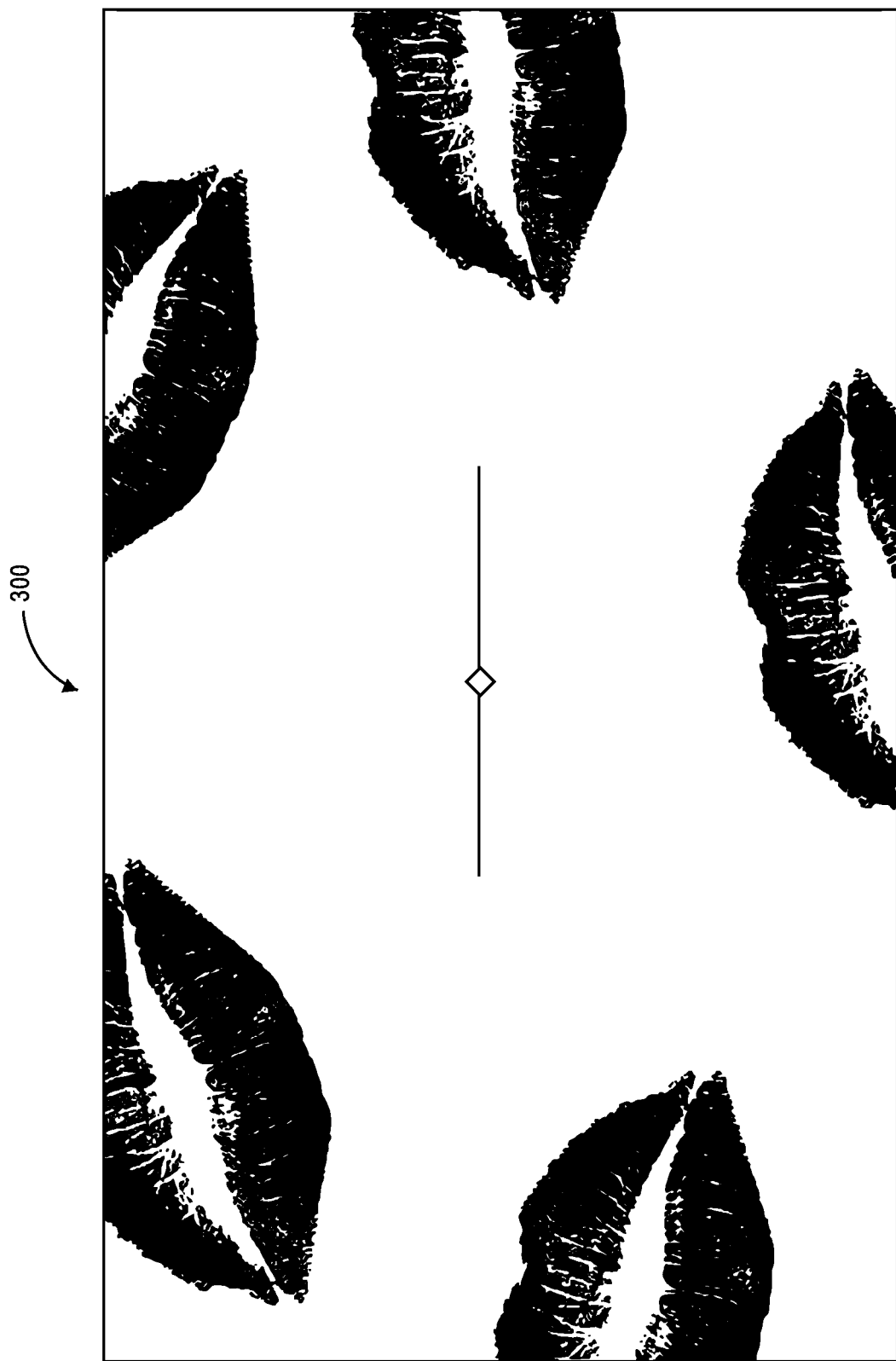

TECHNOLOGIES FOR RENDERING ITEMS WITHIN A USER INTERFACE USING VARIOUS RENDERING EFFECTS

CROSS-REFERENCE TO RELATED APPLICATIONS

This application is a continuation of U.S. patent application Ser. No. 16/661,336, filed Oct. 23, 2019, which is a continuation of U.S. patent application Ser. No. 15/949,931, filed Apr. 10, 2018, the disclosures of which are hereby incorporated by reference in their entireties.

FIELD

The present disclosure is directed to improvements designed to solve problems peculiarly to the user interface of an electronic device, and in particular, to rendering items within a user interface. More particularly, the present disclosure is directed to technologies for dynamically rendering items within a user interface using various rendering effects based on various sensor data.

BACKGROUND

Individuals or customers frequently purchase or order products or items for certain applications or users. For example, an individual may order customized printed products such as brochures and business cards associated with a business. Conventionally, individuals seeking to purchase or order items from a company or business through an e-commerce platform such as a website or software application, encounter problems particular to these channels or platforms.

It is known that final product visualization is important to the customer experience during product ordering. However, replicating a product visualization that is accurate and lifelike on an e-commerce platform has heretofore presented unique challenges. For example, e-commerce platforms are not able to render, in a lifelike manner in a user interface, customized business cards to be reviewed by customers. Thus, customers may not be readily inclined to finalize orders, and businesses may not fully realize product sales.

Accordingly, there is an opportunity for platforms and techniques to render physical products in more accurate and lifelike manner for review by customers.

SUMMARY

In an embodiment, an electronic device for rendering, in a user interface, an item offered for sale on a platform accessible by the electronic device is provided. The electronic device may include a sensor for detecting an orientation of the electronic device, a user interface for displaying content, a memory storing non-transitory computer executable instructions, and a processor interfacing with the sensor, the user interface, and the memory. The processor may be configured to execute the non-transitory computer executable instructions to cause the processor to: initiate a preview feature for the item, retrieve, from the sensor, an initial orientation of the electronic device, determine, based on the initial orientation of the electronic device, an initial rendering effect for the item, cause the user interface to render the item using the initial rendering effect, retrieve, from the sensor, an updated orientation of the electronic device, determine, based on the updated orientation, an updated rendering effect for the item, and cause the user interface to update the rendered item using the updated rendering effect.

In another embodiment, a computer-implemented method in an electronic device of rendering, in a user interface, an item offered for sale on a platform accessible by the electronic device is provided. The method may include: initiate a preview feature for the item; detecting, by an angular sensor, an initial orientation of the electronic device; determining, by a processor of the electronic device based on the initial orientation of the electronic device, an initial rendering effect for the item; displaying, in a user interface, a rendering of the item using the initial rendering effect; detecting, by the angular sensor, an updated orientation of the electronic device; determining, by the processor based on the updated orientation, an updated rendering effect for the item; and displaying, in the user interface, an updated rendering of the item using the updated rendering effect.

In a further embodiment, a computer-implemented method in an electronic device of facilitating an order for a physical item is provided. The method may include: initiating, by a processor of the electronic device, an item preview mode associated with the order for the physical item; while the item preview mode is active: detecting, by an angular sensor, a current orientation of the electronic device, determining, by the processor based on the current orientation of the electronic device, a current rendering effect for the item, displaying, in a user interface, a current rendering of the item using the initial rendering effect, and on a substantially continuous basis until a selection is received via the user interface, repeating the detecting, the determining, and the displaying; and when the selection is received via the user interface, initiating a subsequent mode for the order for the physical item.

BRIEF DESCRIPTION OF THE FIGURES

FIGS. 3A and 3B depict example images used to render items, in accordance with some embodiments.

DETAILED DESCRIPTION

Figure 1:
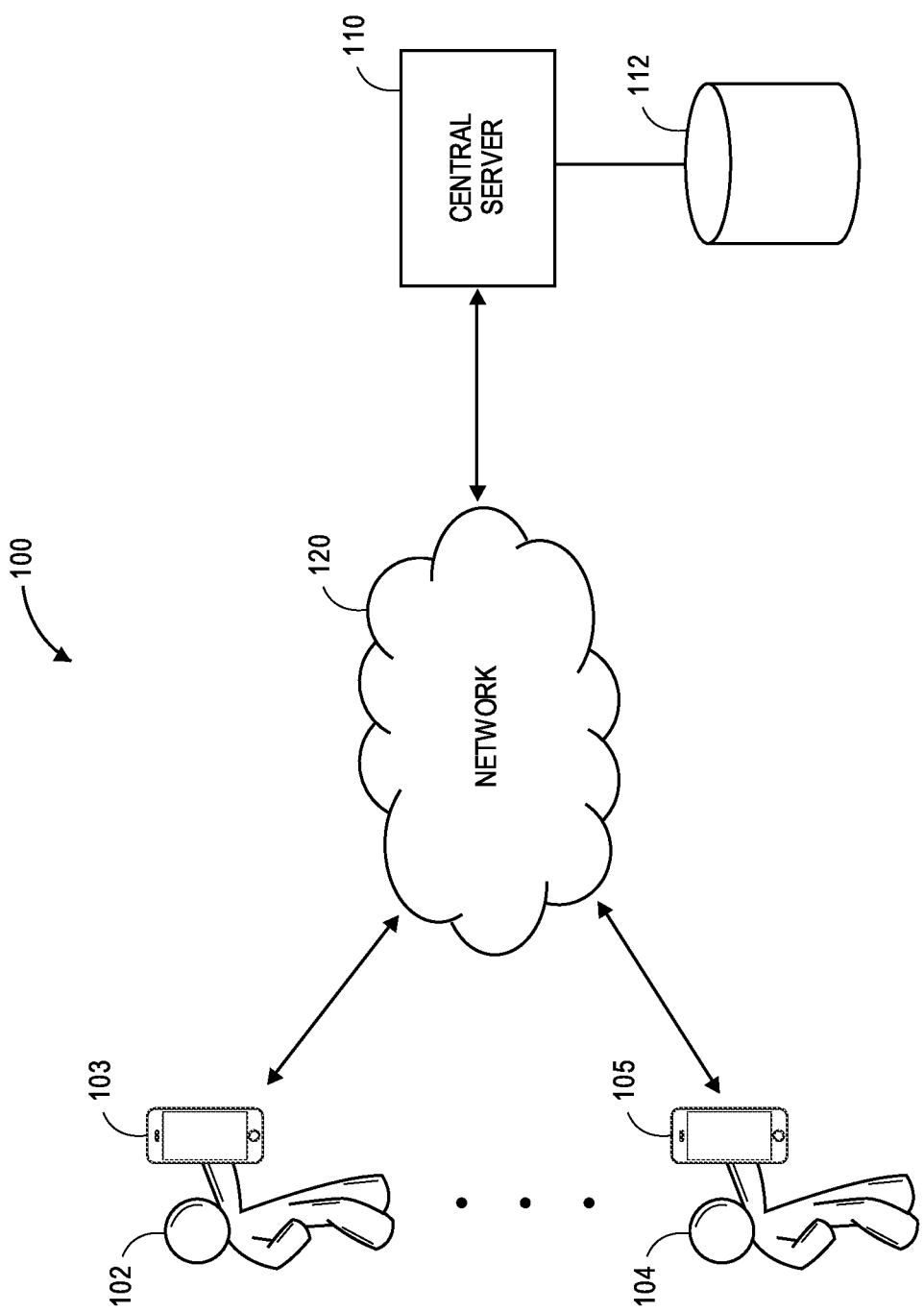
FIG. 1 depicts an overview of components and entities associated with the systems and methods, in accordance with some embodiments.

The present embodiments may relate to, inter alia, platforms and technologies for rendering physical items within a user interface in a lifelike manner. According to certain aspects, an individual or customer may use an electronic device to preview one or more physical items (e.g., customized business cards) in contemplation of ordering the physical item(s). After the individual selects a particular physical item, the electronic device may render the physical item within a user interface, where the rendering may reflect certain sensor data generated by one or more sensors of the electronic device. In particular, the user interface may display a rendering of the physical item that accounts for an orientation of the electronic device detected by an orientation sensor such as an angular rate sensor.

Further, the rendering may include a virtual rendering effect that accounts for the current orientation of the electronic device, such as a reflective or highlighting effect. When the individual changes the orientation of the electronic device, such as by moving or rotating the electronic device, the virtual rendering effect will update to account for the updated orientation of the electronic device. In this regard, the electronic device supports an augmented reality feature that overcomes existing limitations by effectively enabling a lifelike rendering of the physical item displayed within a user interface of the electronic device.

The systems and methods therefore offer numerous benefits. In particular, the augmented reality feature enables the individual to view a lifelike rendering of a desired physical item from multiple angles and orientations. These features enhance final product visualization and improve the individual's experience and satisfaction when ordering the physical item via the electronic device, as the individual is more assured of the look and feel of the actual physical item. Additionally, companies or entities that offer the physical items for sale may experience increased sales. It should be appreciated that additional benefits are envisioned.

The systems and methods discussed herein address a challenge that is particular to e-commerce. In particular, the challenge relates to a difficulty in accurately assessing a physical item for purchase without being able to physically possess or handle the item. Conventionally, a user previews an item via a user interface of an electronic device, where the item preview merely includes one or more images of the item. However, the image(s) do not enable the user to assess the item in a lifelike manner, in contemplation of purchasing the item. The systems and methods offer improved capabilities to solve these problems by generating lifelike rendering effects for items based on sensor data collected from various sensors of the electronic device. Further, because the systems and methods employ the collection, analysis, and processing of certain sensor data, and the communication between and among multiple devices, the systems and methods are necessarily rooted in computer technology in order to overcome the noted shortcomings that specifically arise in the realm of e-commerce.

FIG. 1 illustrates an overview of a system 100 of components configured to facilitate the systems and methods. It should be appreciated that the system 100 is merely an example and that alternative or additional components are envisioned.

As illustrated in FIG. 1, the system 100 may include a set of users 102, 104 or individuals having or interacting with a respective set of electronic devices 103, 105. Each of the users 102, 104 may be any individual or person who may be interested in purchasing items, products, and/or services that may be offered for sale by a retailer. In an embodiment, the retailer may be associated with an entity such as a corporation, company, partnership, or the like, where the retailer may offer an e-commerce platform (e.g., a website accessible by or an application executable by the electronic devices 103, 105) and optionally a set of brick-and-mortal retail stores. Each of the electronic devices 103, 105 may be any type of electronic device such as a mobile device (e.g., a smartphone), notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like.

The electronic devices 103, 105 may communicate with a central server 110 via one or more networks 120. The central server 110 may be associated with the entity that owns and/or manages the e-commerce platform(s) and/or the set of brick-and-mortal retail stores. In particular, the central server 110 may include or support a web server configured to host a website that offers various products and/or services for purchase by users. Further, the central server 110 may support a software application executable by the set of electronic devices 103, 105 (i.e., the set of electronic devices 103, 105 may interface with the central server 110 in executing the software application). In embodiments, the network(s) 120 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

Although depicted as a single central server 110 in FIG. 1, it should be appreciated that the server 110 may be in the form of a distributed cluster of computers, servers, machines, or the like. In this implementation, the entity may utilize the distributed server(s) 110 as part of an on-demand cloud computing platform. Accordingly, when the electronic devices 103, 105 interface with the server 110, the electronic devices 103, 105 may actually interface one or more of a number of distributed computers, servers, machines, or the like, to facilitate the described functionalities.

The central server 110 may be configured to interface with or support a memory or storage 112 capable of storing various data, such as in one or more databases or other forms of storage. According to embodiments, the storage 112 may store data or information associated with products or services that are offered for sale by the entity that owns and/or manages the e-commerce platform and/or the set of brick-and-mortal retail stores. For example, the storage 112 may store information associated with office supplies such as business cards and notepads, including information associated with a customer or client (e.g., company name and logo). Although two (2) users 103, 105, two (2) electronic devices 103, 105, and one (1) server 110 are depicted in FIG. 1, it should be appreciated that greater or fewer amounts are envisioned. For example, there may be multiple central servers, each one associated with a different retailer. Additionally, the electronic devices 103, 105 and the central server 110 may interface with one or more separate, third-party servers (not depicted in FIG. 1) to retrieve relevant data and information.

According to embodiments, the users 102, 104 may select an item(s) to preview using the respective electronic devices 103, 105, such as in contemplation of placing an order for the item(s). Further, each of the electronic devices 103, 105 may be configured with various sensors such as, for example, a location module (e.g., a GPS chip), an image sensor(s), an accelerometer, a clock, a gyroscope (i.e., an angular rate sensor), a magnetometer, a yaw rate sensor, a tilt sensor, telematics sensors, and/or other sensors.

At least the gyroscope may detect sensor data indicative of an orientation of the respective electronic device 103, 105, and the respective electronic device 103, 105 may render the selected item(s) using a rendering effect based on the orientation and optionally on additional sensor data. Additionally, as the users 102, 104 reorient the respective electronic devices 103, 105, the respective electronic devices 103, 105 may automatically and dynamically update the renderings according to updated orientations of the electronic devices 103, 105. These functionalities are further discussed with respect to FIG. 2.

Figure 2:
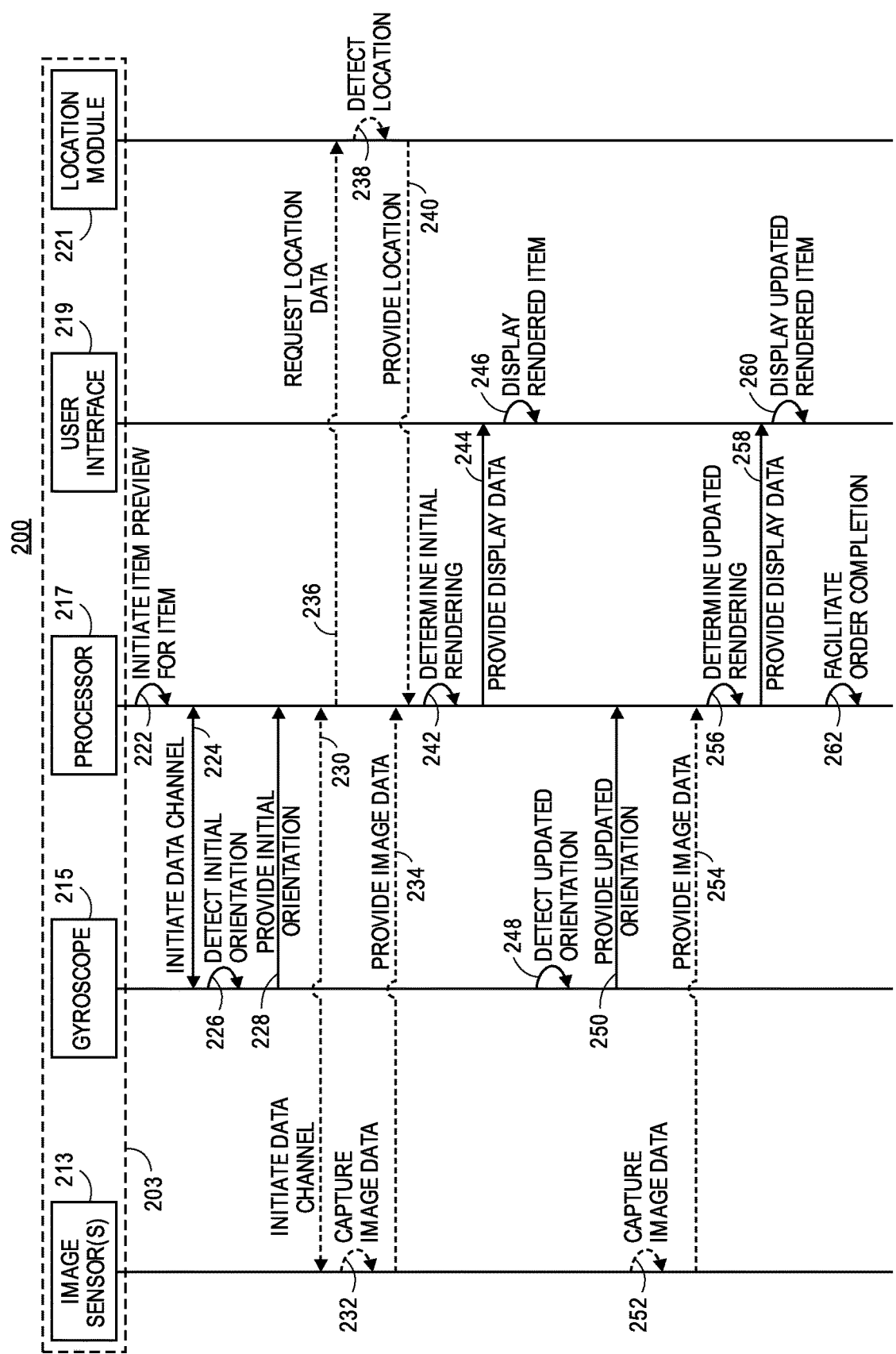
FIG. 2 depicts an example signal diagram associated with facilitating item rendering features, in accordance with some embodiments.

FIG. 2 depicts a signal diagram 200 associated with rendering items within a user interface, in accordance with some embodiments. The signal diagram includes various components, including: an image sensor(s) 213, a gyroscope 215, a processor 217, a user interface 219, and a location module 221. According to embodiments, any or all of the image sensor(s) 213, the gyroscope 215, the processor 217, the user interface 219, and the location module 221 may be incorporated within an electronic device 203 (such as one of the electronic devices 103, 105 as discussed with respect to FIG. 1). It should be appreciated that the electronic device 203 may communicate with a backend server (not shown in FIG. 2; such as the central server 110 as discussed with respect to FIG. 1). Additionally, it should be appreciated that a user may use and interface with the electronic device 203 via the user interface 219 to make certain selections and facilitate certain functionalities.

Generally, the gyroscope 215 may be configured to measure the rate at which the electronic device 203 rotates around a spatial axis(es) (i.e., the angular velocity(ies) of the electronic device 203 around the spatial axis(es)), from which the orientation, and changes in orientation, of the electronic device 203 may be determined. For example, the gyroscope 215 may be a three-axis gyroscope which may generate angular velocity data in each of the three conventional axes x, y, and z. A gyroscope is also known as an angular rate sensor, angular sensor, or angular velocity sensor.

In contrast, an accelerometer is configured to measure a degree of linear acceleration, from which the speed of movement of a corresponding object may be determined. The electronic device 203 may also be configured with an accelerometer (not shown in FIG. 2). Additionally, a magnetometer is configured to measure magnetism, and may be used in, for example, a compass application. It should be appreciated that data generated by the gyroscope 215, an accelerometer, and a magnetometer may be analyzed by the processor 217 in combination in certain applications or calculations. For example, the processor 217 may bias angular velocity data generated by the gyroscope 215 with acceleration data generated by the accelerometer to determine an orientation and movement of the electronic device 203. The terms "gyroscope," "angular rate sensor," "angular sensor," and "angular velocity sensor" may be used throughout this description interchangeably.

Additionally, the image sensor(s) 213 may include a front-oriented image sensor and/or a back-oriented image sensor. It should be appreciated that alternative or additional sensors not depicted in FIG. 2 are envisioned (e.g., ambient light sensors, proximity sensors, accelerometers, etc.).

The signal diagram 200 may begin when the processor 217 initiates (222) an item preview mode for an item within an e-commerce platform (e.g., application, website, etc.) accessible by the electronic device 203. In embodiments, the user of the electronic device 203 may initiate the item preview mode for one or more physical items that the user may intend to assess for purchase. For example, the item may be a paper-based item (e.g., business cards, note pads, book, etc.), toy, electronic, clothing or apparel, appliance, baby/kid item, sports/outdoor item, beauty/health product, grocery, home improvement item or tool, handmade item, art piece, instrument, and/or any other physical item. Additionally, the item may be stock or pre-designed, or may be customized (e.g., a customized business card).

In initiating the item preview mode, the processor 217 may interface with the backend server, such as via a transceiver, where the backend server may communicate information relevant to the item preview mode, such as an image(s) of the item and other information associated with the item. In embodiments, the item preview mode may be associated with a checkout procedure for an order of the item, in which case the backend server may provide information such as item availability, cost, image(s), shipping information, payment information, and/or other information. In a scenario, the user may select, via the user interface 219, to view a rendering of the item(s).

In association with the item preview mode, the processor 217 may initiate (224) a data channel or communication with the gyroscope 215, which may enable the gyroscope 215 to automatically and continuously detect and transmit angular rate or velocity data indicative of an orientation of the electronic device 203. In an implementation, the processor 217 may explicitly retrieve current angular velocity data from the gyroscope 215. The gyroscope 215 may accordingly detect (226) an initial orientation (e.g., in the form of initial angular velocity data), and provide (228) the initial orientation to the processor 217. Accordingly, the processor 217 may examine the initial angular velocity data to determine the initial orientation of the electronic device 203.

According to optional embodiments(s), the processor 217 may retrieve supplemental/additional data from various of the components. In an implementation, the processor 217 may initiate (230) a data channel with the image sensor(s) 213, which may enable the image sensor(s) 213 to automatically and continuously capture a set of image data. In an implementation, the processor 217 may explicitly retrieve a set of image data from the image sensor(s) 213. The image sensor(s) 213 may accordingly capture (232) a set of image data (i.e., in the form of one or more digital images, or a stream of digital images), and provide (234) the set of image data to the processor 217. If there are multiple image sensors 213, the user may select which of the image sensors 213 should capture data, or there may be a default image sensor 213.

In an additional or alternative implementation, the processor 217 may request (236) location data from the location module 221. Accordingly, the location module 221 may detect (238) a current location of the electronic device 203 (e.g., in the form of GPS coordinates), and provide (240) the current location to the processor 217. In embodiments, the processor 217 may initiate a data channel with the location module 221, which may enable the location module 221 to automatically and continuously detect a current location and transmit the current location to the processor 217. Although not depicted in FIG. 2, it should be appreciated that the processor 217 may interface with an additional sensor(s) (e.g., ambient light sensors, proximity sensors, accelerometers, etc.) to retrieve relevant sensor data.

The processor 217 may determine (242) an initial rendering of the item based on at least a portion of any received sensor data. In particular, the processor 217 may determine the initial rendering based on any combination of the angular velocity data received from the gyroscope 215, the set of image data received from the image sensor(s) 213, the location data from the location module 221, and any other received sensor data.

In an implementation, the processor 217 may account for the size/dimensions of the user interface 219 of the electronic device 203 when determining the initial rendering. In this regard, the processor 217 may determine whether it is possible to render the item in its actual size (i.e., 1:1 size ratio). For example, if the user interface 219 has dimensions of 2.5×5.5 inches and the item is a business card with dimensions of 2×3.5 inches, then the processor 217 may determine that the business card may be displayed in its actual size, to be reflected in the initial rendering, which may optionally indicate whether an item is displayed in its actual size. In this regard, larger electronic devices (e.g., tablets) may be capable of displaying larger items (e.g., memo pads) in their actual sizes.

The application or browser (as executed by the processor 217) may determine the size/dimensions of the user interface 219 using an API. In particular, the application or browser may provide a number of pixels for the dimensions (e.g., height and width) of the user interface 219, and the processor 217 may calculate the number of pixels needed to display the item according to the actual size of the item. Alternatively, the application or browser may access a database of browser "user agents" that map to physical dimensions of the user interface 219.

In determining the initial rendering, the processor 217 may determine one or more rendering effects to be applied to the item. In a particular embodiment, the rendering effect may be a reflection effect in which certain portion(s) of the item are emphasized or highlighted to simulate the presence of a light source fixedly positioned relative to the electronic device 203. To determine or create a reflection effect, the processor 217 may access a "mask" image(s) corresponding to the item, where the mask image(s) may align with an image(s) of the item. The processor 217 may determine, based on at least the initial orientation and optionally on additional sensor data, a portion of the image of the item on which to apply the reflection effect, and may identify a corresponding portion of the mask image. Accordingly, to determine or create the reflection effect, the processor 217 may overlay the corresponding portion of the mask image on the portion of the image of the item. When rendered, the corresponding portion will simulate a light reflection on the portion of the image of the item. These functionalities are described in further detail with respect to FIGS. 3A, 3B, 4A, and 4B.

Although the embodiments describe the reflection effect, it should be appreciated that the rendering effect may be one or more alternative effects. In an embodiment, the rendering effect may be associated with a 3D model of the item. In operation, the processor 217 may generate a 3D model of the item according to the physical dimensions of the items and cause the user interface 219 to display the 3D model of the item. The processor 217 may cause the displayed 3D model to be maneuvered according to data generated by the gyroscope 215. Additionally, the rendered effect on the 3D model may be a reflection effect on one or more surfaces in the 3D model (e.g., to simulate a virtual light source). The 3D model and rendering thereof may contemplate characteristics of the physical item model itself (e.g., angles, surfaces, corners, edges, etc.), one or more virtual light sources (e.g., to simulate shadows, reflections, and other effects), and other variables. To render the 3D model and its rendering effect(s), the processor 217 may or not use a set of mask images.

In another embodiment, an additional rendering effect may simulate a shadow effect, such as when a product or item includes "raised print" or textual/graphical content that protrudes from the underlying substrate surface (e.g., a business card). Thus, the rendering effects may include a reflection effect to simulate a reflection(s) on a portion(s) of the textual/graphical content, as well as a shadow effect to simulate a shadow(s) on the substrate surface and/or around a portion of the textual/graphical content. Accordingly, the processor 217 may cause the user interface 219 to render the substrate surface and its raised print, and update the rendering with these rendering effects according to updated data from the gyroscope 215 (i.e., updated orientation data). As an additional example, the rendering effect may be a highlighting effect, an enlargement/compression effect, or another effect. Generally, the rendering effect may be used to create a lifelike effect on a rendered item that corresponds to an orientation and movement(s) of the electronic device 203.

Additionally, the processor 217 may also account for various additional data in determining the rendering effect. For example, the processor 217 may account for timing data (e.g., time of day, day of week, day of year, etc.) and/or location data to simulate an actual position of the sun (and a brightness level thereof) relative to the electronic device 203. For further example, the processor 217 may account for data from an ambient light sensor to determine a brightness degree for the rendering effect. It should be appreciated that additional use cases for the various additional data are contemplated.

The processor 217 may provide (244) display data to the user interface 219 for display in the user interface 219. In embodiments, the display data may include data representative of the initial rendering determined in (242). Additionally, the display data may include at least a portion of the image data captured in (232). The user interface 219 may display (236) the rendered item according to the display data received from the processor 217. In particular, the user interface 219 may display the rendered item with any determined rendering effects, such that the user may view the user interface 219 and assess the rendered item. In an example embodiment, the user interface 219 may display the rendered item in a foreground position, and may fill in the background (i.e., the remainder of the user interface) with at least a portion of the captured image data, thus simulating a "live view" effect according to the positioning of the electronic device 203.

Generally, the electronic device 203 and components thereof may support a "live view" of the rendered item, which depicts changes to the rendered item, and changes to a rendering effect(s), according to updated sensor data. Accordingly, the gyroscope 215 may automatically and continuously detect (248) an updated orientation (i.e., in the form of updated angular velocity data), and provide (250) the updated orientation to the processor 217. Accordingly, the processor 217 may examine the updated angular velocity data to determine the updated orientation of the electronic device 203. Additionally, the image sensor(s) 213 may capture (252) an additional set of image data (i.e., in the form of one or more digital images, or a stream of digital images), and provide (254) the additional set of image data to the processor 217. It should be appreciated that additional sensors (e.g., the location module 221, ambient light sensors, proximity sensors, accelerometers, etc.) may generate updated sensor data and provide the updated sensor data to the processor 217.

The processor 217 may determine (256) an updated rendering of the item based on at least a portion of any received updated sensor data. In particular, the processor 217 may determine the updated rendering based on any combination of the updated angular velocity data received from the gyroscope 215 and the updated set of image data received from the image sensor(s) 213 (and optionally any updated sensor data received from an additional sensor(s), not depicted in FIG. 2).

Similar to the initial rendering, the processor 217 may determine one or more updated rendering effects to be applied to the item. In a particular embodiment, the updated rendering effect may be an updated reflection effect in which certain portion(s) of the item are emphasized or highlighted to simulate the presence of a light source fixedly positioned relative to the electronic device 203. The processor 217 may determine the updated reflection effect similar to how the reflection effect is determined, as discussed herein. Thus, when the user reorients the electronic device 203 (e.g., by angling the electronic device 203 in different directions), the updated rendering effect may simulate the electronic device 203 being in different positions relative to the simulated light source. It should be appreciated that additional updated rendering effects are envisioned.

The processor 217 may provide (258) display data to the user interface 219 for display in the user interface 219. In embodiments, the display data may include data representative of the updated rendering determined in (256). Additionally, the display data may include at least a portion of the image data captured in (252). The user interface 219 may display (260) the rendered item according to the display data received from the processor 217. In particular, the user interface 219 may display the rendered item with any determined updated rendering effects, such that the user may view the user interface 219 and assess any updates to the rendered item. It should be appreciated that any of (248), (250), (252), (254), (256), (258), and (260) may be repeated continuously and automatically, such as until the user of the electronic device 203 exits the image preview mode or otherwise proceeds to other functionality.

The processor 217 may further facilitate (262) an order completion for the item. In particular, the processor 217 may receive, from the user interface 219, any selections associated with the order (e.g., quantity, shipping information, payment information, contact information, etc.), and may interface with the backend server to complete the order according to the order information. In this regard, the user may use the electronic device 203 to review the item in a lifelike simulation with various rendering effects within the user interface 219 prior to deciding whether to purchase the item.

Although the embodiments discussed herein describe the processor 217 processing the sensor data and generating the renderings, it should be appreciated that the backend server (e.g., the central server 110 as discussed with respect to FIG. 1) may alternatively process the sensor data, generate the renderings, and facilitate communications with the electronic device 203. In operation, the electronic device 203 may transmit any captured sensor data to the backend server (e.g., data from the gyroscope 215, image sensor(s) 213, and/or other sensors), where the backend server may process the captured sensor data and generate the renderings with the applied rendering effect(s). Additionally, the backend server may transmit the corresponding display data to the electronic device 203 for display on the user interface 219. The electronic device 203 may transmit any updated sensor data, and the backend server may accordingly process the updated sensor data, in real-time or near-real-time as the updated sensor data is captured, so that the user interface 219 may display the rendered item according to the real-time or near-real-time orientation of the electronic device 203.

Figure 3B:
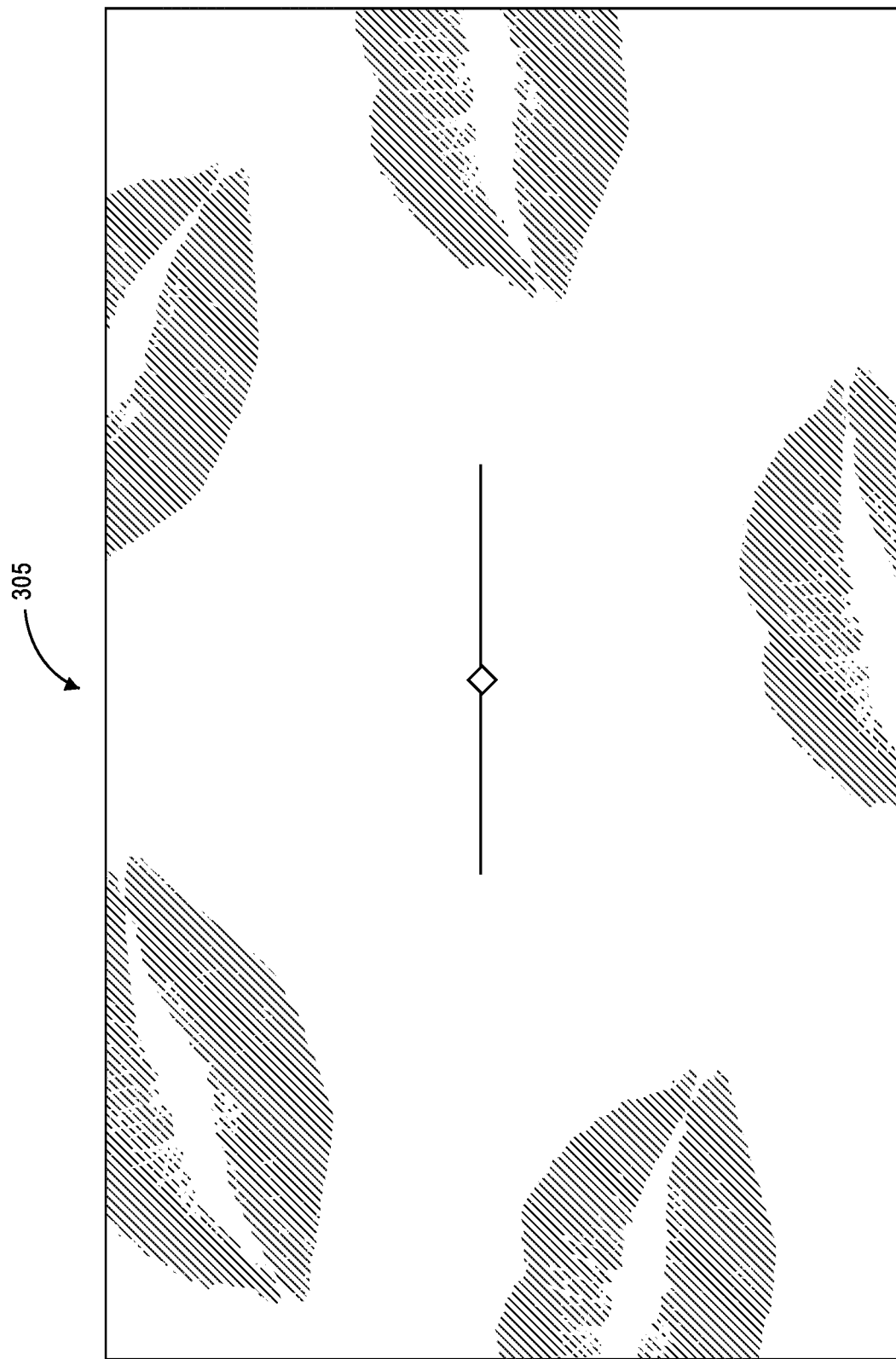

FIGS. 3A and 3B depict example images that may be used to create an example rendering effect for an item. In particular, FIGS. 3A and 3B depict respective images 300, 305 of a template of a business card having a lip motif design. Additionally, an individual may contemplate ordering the business card having the lip motif design. The image 300 of FIG. 3A represents what the front of the business card actually looks like, and the image 305 of FIG. 3B is a "mask" image that may be used to create a rendering effect on various content included in the business card.

In operation, certain portions of the mask image 305 may be overlaid on respective portions of the image 300 to create the rendering effect, which in this example is a reflective, "shimmery" effect. This rendering effect simulates a virtual light source being directed toward the image 300. An electronic device may display the image 300 as well as the certain portions of the mask image 305 that are overlaid on the respective portions of the image 300. The electronic device may determine which portions of the mask image 305 to overlay based on certain sensor data, such as sensor data indicating an orientation of the electronic device.

Thus, when a user of the electronic device orients the electronic device in an initial orientation, the electronic device may display the image 300 with a first portion of the mask image 305 overlaid thereon; and when the user reorients the electronic device in an updated orientation, the electronic device may display the image 300 with a second, different portion of the mask image 305 overlaid thereon. These movements, then, result in the displayed image 300 and overlaid portions simulating a lifelike handling of the business card by the user, by simulating movement of the virtual light source in relation to the electronic device.

Figure 4B:
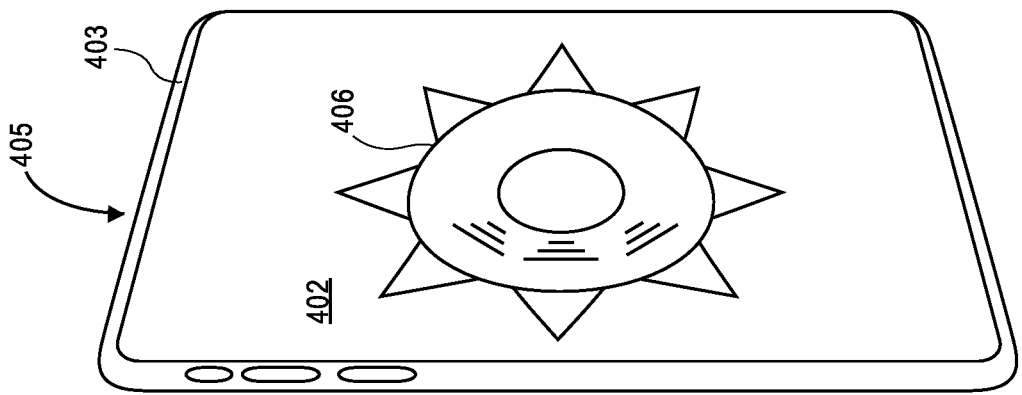
FIGS. 4A and 4B depict peripheral views of an example electronic device with an object rendered thereon, in accordance with some embodiments.
Figure 4A:
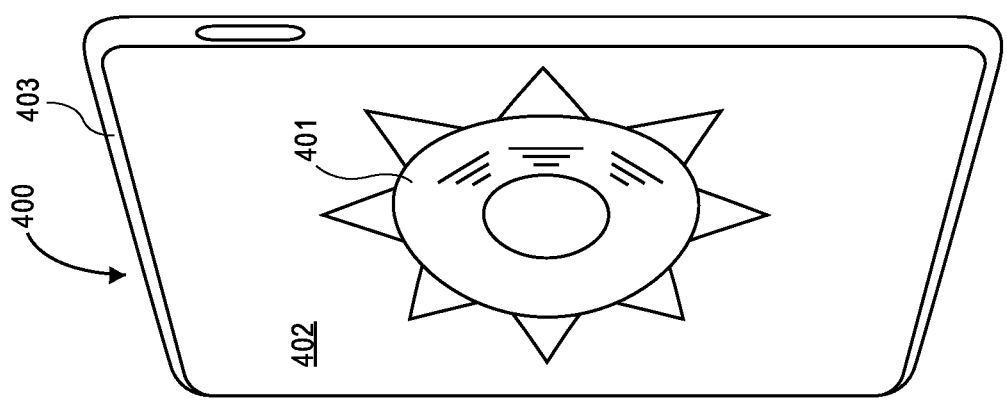

FIGS. 4A and 4B depict perspective views of an electronic device 403 and a user interface 102 thereof. In particular, FIG. 4A depicts the electronic device 403 in an orientation 400 where the right side is angled closer to the viewer than is the left side, and FIG. 4B depicts the electronic device 403 in an orientation 405 where the left side is angled closer to the viewer than is the right side. The user interface 402 as depicted in FIG. 4A displays a graphic 401 of a sun and the user interface 402 as depicted in FIG. 4B displays a graphic 406 of the same sun.

As depicted in FIG. 4A, the graphic 401 has a reflective effect on the right side of the sun, reflecting that the right side of the sun is angled closer to the viewer (i.e., the user of the electronic device 403). Similarly, the graphic 406 as depicted in FIG. 4B has the reflective effect on the left side of the sun, reflecting that the left side of the sun is angled closer to the viewer. In operation, the viewer may orient the electronic device in different orientations to achieve the reflective effect on different portions of the sun.

Figure 5:
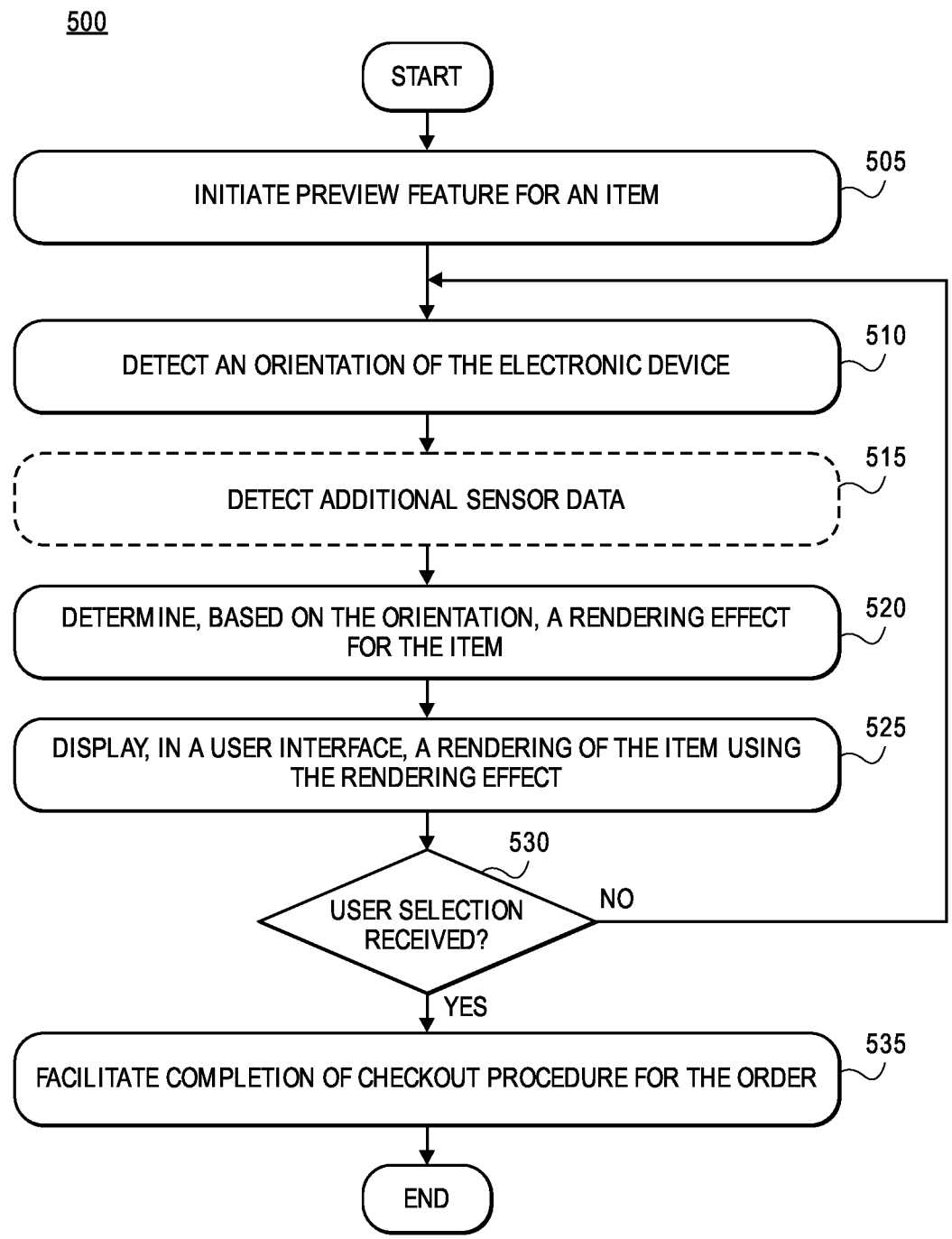
FIG. 5 depicts an example flow diagram associated with rendering an item within a user interface based on various sensor data, in accordance with some embodiments.

FIG. 5 depicts is a block diagram of an example method 500 for rendering an item within a user interface based on various sensor data. The method 500 may be facilitated by an electronic device (such as the electronic device 203 as discussed with respect to FIG. 2) that may be in communication with a server (such as the central server 110 as discussed with respect to FIG. 1).

The method 500 may begin when the electronic device initiates (block 505) a preview feature for the item. In embodiments, a user of the electronic device may select to initiate the preview feature, such as by browsing for the item on an e-commerce platform and selecting to view the item in the preview feature. Further, the preview feature may be associated with a checkout procedure for ordering the item, where the preview feature enables the user to view a rendering of the item prior to completing or submitting the order for the item.

As part of the preview feature, the electronic device may detect (block 510) an orientation of the electronic device. According to embodiments, the orientation may be detected by an angular rate sensor (i.e., a gyroscope) that generates corresponding angular rate or rotational motion data, from which the electronic device may determine the orientation of the electronic device.

The electronic device may optionally detect (block 515) additional sensor data. In embodiments, an ambient light sensor may detect lighting condition data in a vicinity of the electronic device, a location module (e.g., a GPS module) may detect a location of the electronic device, and/or an image sensor (e.g., a front- or back-oriented camera) may capture a set of image data. It should be appreciated that additional sensors and additional sensor data are envisioned, as well as certain timing data (e.g., time of day, day of week, day of year, etc.).

The electronic device may determine (block 520), based on the orientation and optionally on any detected additional sensor data, a rendering effect for the item. In an embodiment, the electronic device may determine, based on the orientation, a portion of the item to be rendered with a reflection effect, access a mask image corresponding to the item, where the mask image may include a mask portion corresponding to the portion of the item, and determine the rendering effect to create the reflection effect by overlaying the mask portion of the mask image on the portion of the item. In an alternative or additional embodiment, the electronic device may, in determining the rendering effect, account for any lighting condition data detected by the ambient light sensor, any location data detected by the location module, and/or any set of image data captured by the image sensor.

The electronic device may display (block 525), in a user interface, a rendering of the item using the rendering effect. In an embodiment, the electronic device may display the rendering of the item overlaid on any portion of the set of image data captured by the image sensor, such that the user interface may display at least a partial "live view" corresponding to the captured image sensor data.

The electronic device may also monitor for a user selection associated with ceasing the preview feature or otherwise proceeding to a subsequent step of a checkout procedure. Accordingly, the electronic device may determine (block 530) if an appropriate user selection is received. If an appropriate user selection is not received ("NO"), processing may return to 510 to monitor for an updated orientation, or to other functionality. If an appropriate user selection is received ("YES"), the electronic device may facilitate (block 535) completion of a checkout procedure for the order. In particular, the electronic device may complete the order based on any selections made by the user. It should be appreciated that the electronic device may continuously monitor for the user selection, and is not limited to making the determination at block 530.

Figure 6:
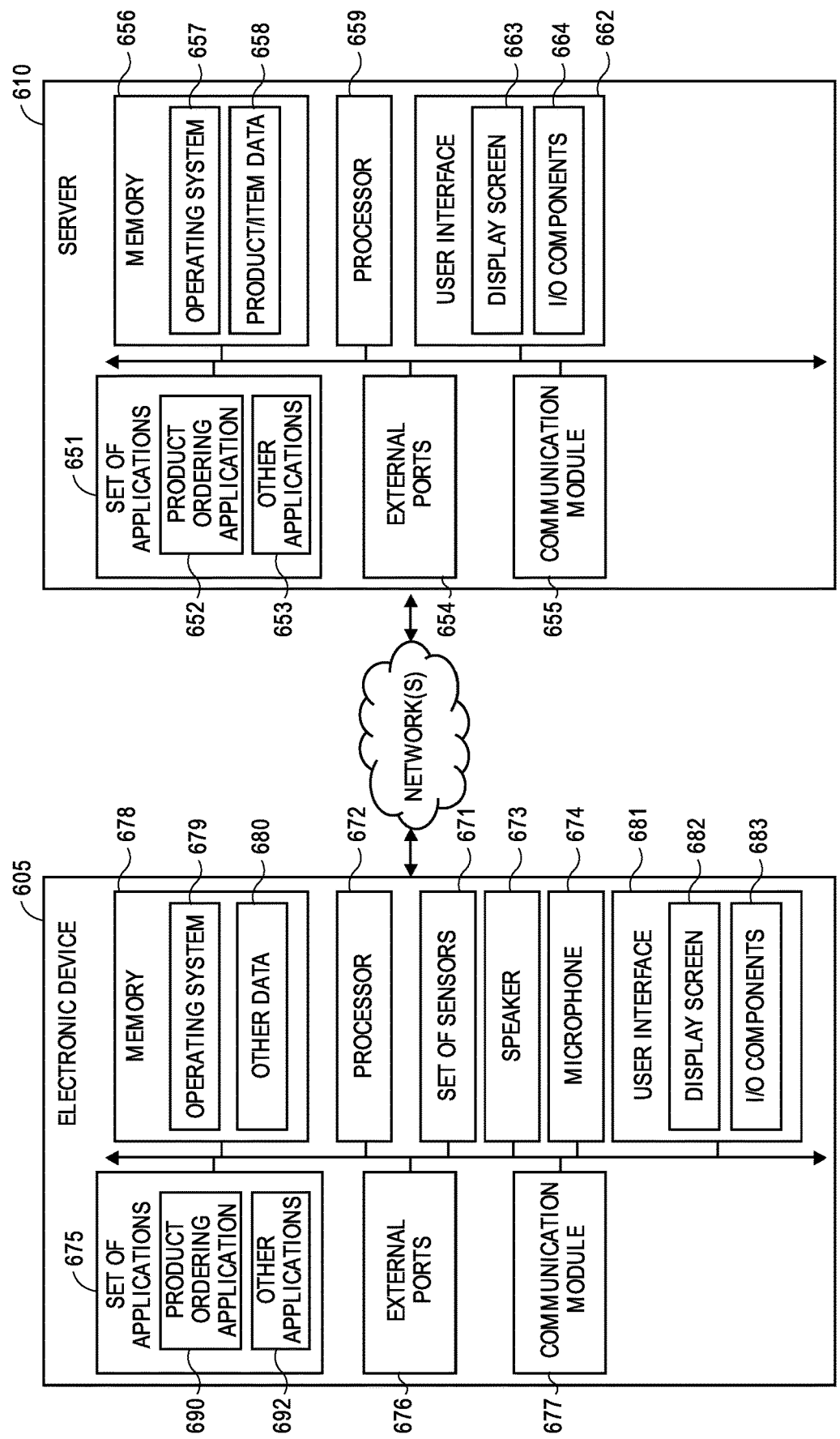
FIG. 6 is a block diagram of an example electronic device and an example server, in accordance with some embodiments.

FIG. 6 illustrates a hardware diagram of an example electronic device 605 (such as the electronic device 203 as discussed with respect to FIG. 2) and an example server 610 (such as the central server 110 as discussed with respect to FIG. 1), in which the functionalities as discussed herein may be implemented.

The electronic device 605 may include a processor 672 as well as a memory 678. The memory 678 may store an operating system 679 capable of facilitating the functionalities as discussed herein as well as a set of applications 675 (i.e., machine readable instructions). For example, one of the set of applications 675 may be a product ordering application 690 configured to facilitate certain product ordering functionalities as discussed herein. It should be appreciated that one or more other applications 692, such as a web browser application, are envisioned.

The processor 672 may interface with the memory 678 to execute the operating system 679 and the set of applications 675. According to some embodiments, the memory 678 may also store other data 680 that may include data accessed or collected by various sensors. The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 605 may further include a communication module 677 configured to communicate data via one or more networks 620. According to some embodiments, the communication module 677 may include one or more transceivers (e.g., WWAN, WLAN, and/or WPAN transceivers) functioning in accordance with IEEE standards, 3GPP standards, or other standards, and configured to receive and transmit data via one or more external ports 676.

The electronic device 605 may include a set of sensors 671 such as, for example, a location module (e.g., a GPS chip), an image sensor, an accelerometer, a clock, a gyroscope (i.e., an angular rate sensor), a compass, a yaw rate sensor, a tilt sensor, telematics sensors, and/or other sensors. The electronic device 605 may further include a user interface 681 configured to present information to a user and/or receive inputs from the user. As shown in FIG. 6, the user interface 681 may include a display screen 682 and I/O components 683 (e.g., ports, capacitive or resistive touch sensitive input panels, keys, buttons, lights, LEDs). According to some embodiments, the user may access the electronic device 605 via the user interface 681 to review information such product renderings, make selections, and/or perform other functions. Additionally, the electronic device 605 may include a speaker 673 configured to output audio data and a microphone 674 configured to detect audio.

In some embodiments, the electronic device 605 may perform the functionalities as discussed herein as part of a "cloud" network or may otherwise communicate with other hardware or software components within the cloud to send, retrieve, or otherwise analyze data.

As illustrated in FIG. 6, the electronic device 605 may communicate and interface with the server 610 via the network(s) 620. The server 610 may include a processor 659 as well as a memory 656. The memory 656 may store an operating system 657 capable of facilitating the functionalities as discussed herein as well as a set of applications 651 (i.e., machine readable instructions). For example, one of the set of applications 651 may be a product ordering application 652 configured to facilitate various of the product ordering functionalities discussed herein. It should be appreciated that one or more other applications 653 are envisioned.

The processor 659 may interface with the memory 656 to execute the operating system 657 and the set of applications 651. According to some embodiments, the memory 656 may also store product/item data 658, such as data or information associated with products and items that may be offered for sale. The memory 656 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 610 may further include a communication module 655 configured to communicate data via the one or more networks 620. According to some embodiments, the communication module 655 may include one or more transceivers (e.g., WWAN, WLAN, and/or WPAN transceivers) functioning in accordance with IEEE standards, 3GPP standards, or other standards, and configured to receive and transmit data via one or more external ports 654. For example, the communication module 655 may receive, from the electronic device 605, location-based data.

The server 610 may further include a user interface 662 configured to present information to a user and/or receive inputs from the user. As shown in FIG. 6, the user interface 662 may include a display screen 663 and I/O components 664 (e.g., ports, capacitive or resistive touch sensitive input panels, keys, buttons, lights, LEDs). According to some embodiments, the user may access the server 610 via the user interface 662 to review information, make changes, input training data, and/or perform other functions.

In some embodiments, the server 610 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 672, 659 (e.g., working in connection with the respective operating systems 679, 657) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. An electronic device for rendering, in a user interface, an item, comprising:
    a light sensor;
    a user interface;
    a memory storing non-transitory computer executable instructions; and
    a processor interfacing with the light sensor, the user interface, and the memory, wherein the processor is configured to execute the non-transitory computer executable instructions to cause the processor to:
        identify an orientation of the electronic device,
        retrieve lighting condition data from the light sensor,
        determine, based on the orientation of the electronic device and the lighting condition data from the light sensor, a rendering effect for the item, and
        cause the user interface to render the item using the rendering effect.

2. The electronic device of claim 1, wherein to determine the rendering effect for the item, the processor is configured to:
    determine, based on the orientation of the electronic device and the lighting condition data from the light sensor, a portion of the item to be rendered with a reflection effect,
    access a mask image corresponding to the item, the mask image having a mask portion corresponding to the portion of the item, and
    determine the rendering effect to create the reflection effect by overlaying the mask portion of the mask image on the portion of the item.

3. The electronic device of claim 1, further comprising:
    a sensor for detecting the orientation of the electronic device.

4. The electronic device of claim 3, wherein the sensor is a gyroscope that senses rotational motion of the electronic device.

5. The electronic device of claim 1, further comprising a location module, wherein to determine the rendering effect for the item, the processor is configured to:
    retrieve a detected location from the location module, and
    determine, based on the orientation of the electronic device, the lighting condition data, and the detected location, the rendering effect for the item.

6. The electronic device of claim 1, further comprising an image sensor configured to capture a set of image data, wherein to determine the rendering effect for the item, the processor is configured to:
    determine, based on the orientation of the electronic device, the lighting condition data, and the set of image data, the rendering effect for the item.

7. The electronic device of claim 1, wherein the processor is further configured to:
    receive, via the user interface, a selection to complete an order for the item, and
    in response to receiving the selection, facilitate completion of the order for the item.

8. A computer-implemented method in an electronic device of rendering, in a user interface, an item, the method comprising:
    detecting, by an angular sensor, an orientation of the electronic device;
    retrieving, by a light sensor, lighting condition data;

determining, by a processor of the electronic device based on the orientation of the electronic device and the lighting condition data, a rendering effect for the item; and displaying, in a user interface, a rendering of the item using the rendering effect.

9. The computer-implemented method of claim 8, wherein determining the rendering effect for the item comprises:

determining, based on the orientation of the electronic device and the lighting condition data, an initial portion of the item to be rendered with a reflection effect;

accessing a mask image corresponding to the item, the mask image having an initial mask portion corresponding to the initial portion of the item; and determining the rendering effect to create the reflection effect by overlaying the initial mask portion of the mask image on the initial portion of the item.

10. The computer-implemented method of claim 8, wherein retrieving the lighting condition data comprises:

retrieving, from an ambient light sensor, the lighting condition data.

11. The computer-implemented method of claim 8, wherein determining the rendering effect for the item comprises:

detecting, by a location module, a location of the electronic device; and determining, based on the orientation of the electronic device, the lighting condition data, and the location of the electronic device, the rendering effect for the item.

12. The computer-implemented method of claim 8, wherein determining the rendering effect for the item comprises:

determining, based on the orientation of the electronic device, the lighting condition data, and a set of image data captured by a light sensor, the rendering effect for the item.

13. The computer-implemented method of claim 8, further comprising:

receiving, via the user interface, a selection to complete an order for the item; and in response to receiving the selection, facilitating completion of the order.

14. The computer-implemented method of claim 8, wherein detecting the orientation of the electronic device comprises:

detecting, by a gyroscope that senses rotational motion of the electronic device, the orientation of the electronic device.

15. A computer-implemented method in an electronic device of facilitating an order for a physical item, the method comprising:

initiating, by a processor of the electronic device, an item preview mode associated with the order for the physical item;

while the item preview mode is active:
detecting, by an angular sensor, an orientation of the electronic device,
retrieving, from a light sensor, lighting condition data,
determining, by the processor based on the orientation of the electronic device and the lighting condition data, a rendering effect for the physical item, and
displaying, in a user interface, a rendering of the item using the rendering effect; and when a selection is received via the user interface, initiating a subsequent mode associated with the order for the physical item.

16. The computer-implemented method of claim 15, wherein determining the rendering effect for the physical item comprises:

determining, based on the orientation of the electronic device and the lighting condition data, a portion of the physical item to be rendered with a reflection effect, accessing a mask image corresponding to the physical item, the mask image having a mask portion corresponding to the portion of the physical item, and determining the rendering effect to create the reflection effect by overlaying the mask portion of the mask image on the portion of the physical item.

17. The computer-implemented method of claim 15, wherein retrieving the lighting condition data comprises:

retrieving, from an ambient light sensor, the lighting condition data.

18. The computer-implemented method of claim 15, wherein determining, based on the orientation, the rendering effect for the physical item comprises:

detecting, by a location module, a location of the electronic device; and determining, based on the orientation of the electronic device, the lighting condition data, and the location of the electronic device, the rendering effect for the physical item.

19. The computer-implemented method of claim 15, wherein determining the rendering effect for the physical item comprises:

determining, based on the orientation of the electronic device, the lighting condition data, and a set of image data captured by a light sensor, the rendering effect for the item.

20. The computer-implemented method of claim 15, wherein initiating the subsequent mode comprises:

receiving, via the user interface, a order selection to complete an order for the physical item; and in response to receiving the order selection, facilitating completion of the order.

* * * * *